United States Patent
Hedegaard

(12)
(10) Patent No.: US 6,454,183 B1
(45) Date of Patent: Sep. 24, 2002

(54) SPRAYER BOOM

(76) Inventor: Albert Hedegaard, Lille Hedegårdsvej 2, Borbjerg, Holstebro (DK), 7500

(\*) Notice: Subject to any disclaimer, the term of this patent is extended or adjusted under 35 U.S.C. 154(b) by 0 days.

(21) Appl. No.: 09/626,380

(22) Filed: Jul. 26, 2000

Related U.S. Application Data

(63) Continuation of application No. PCT/DK99/00032, filed on Jan. 22, 1999.

(30) Foreign Application Priority Data

Jan. 26, 1998 (DK) .......................................... 1998 0099

(51) Int. Cl.$^7$ .............................................. A01G 25/09
(52) U.S. Cl. ...................... 239/172; 239/155; 239/161; 239/163; 239/170; 239/176; 239/550; 239/569; 239/67
(58) Field of Search ................................ 239/172, 155, 239/159, 161–163, 176, 156, 166, 170, 62, 67, 550, 569

(56) References Cited

U.S. PATENT DOCUMENTS

| | | | |
|---|---|---|---|
| 3,782,634 A | | 1/1974 | Herman |
| 3,877,645 A | \* | 4/1975 | Oligschlaeger ............. 239/155 |
| 4,083,494 A | | 4/1978 | Ballu |
| 4,397,421 A | \* | 8/1983 | Schram ...................... 239/170 |
| 4,817,870 A | \* | 4/1989 | Dalton ....................... 239/166 |
| 5,957,621 A | \* | 9/1999 | Clark, Jr. et al. ........... 239/159 |

FOREIGN PATENT DOCUMENTS

| | | | |
|---|---|---|---|
| DE | 2218 685 | 4/1972 | |
| DE | 2604 836 | 2/1976 | |
| EP | WO91/02599 | \* 3/1991 | ................. 239/172 |
| JP | 8218339 | 10/1972 | |
| JP | 9047204 | 2/1997 | |

\* cited by examiner

*Primary Examiner*—Lesley D. Morris
*Assistant Examiner*—Dinh Q. Nguyen
(74) *Attorney, Agent, or Firm*—Pennie & Edmonds LLP

(57) ABSTRACT

A sprayer boom on a vehicle serves for by means of a number of liquid nozzles spraying a carriageway with a liquid fed under pressure to the nozzles from a storage container via a feed pipe. The nozzles are divided into sets with each their valve arrangement for selectively shutting off and opening for liquid supply to the respective set. The sprayer boom is suitable for tasks where the same amount of liquid per area unit must be sprayed across the area the vehicle passes irrespective of the speed of the vehicle, in as much as the nozzle sets can be regulated quickly and easily to optimum functioning at a given speed and a corresponding liquid flow.

24 Claims, 6 Drawing Sheets

SPRAYER BOOM

RELATED APPLICATIONS

This application is a continuation of the National Stage of International Application PCT/DK99/00032, filed Jan. 22, 1999.

FIELD OF THE INVENTION

The invention relates to a sprayer boom on a vehicle and of the kind which has a number of liquid nozzles for spraying the carriageway during driving with a liquid fed under pressure to the nozzles from a storage container via a feed pipe.

BACKGROUND OF THE INVENTION

For economic and environmental reasons, it is usually advantageous not to use more spray liquid per area unit than what is highly necessary. This applies to e.g. spraying crops with pesticides or icy and snow-slippery roads with a brine.

During spraying, the vehicle must often change speed. Thus, a salt truck spraying brine on icy roads in a town has, to a great or small extent, to follow the changing rhythm of the traffic.

The quantity of brine which is necessary to spray the carriageway with per area unit should however always be the same irrespective of the speed. Neither more nor less. The salt trucks are therefore often provided with equipment for regulating the liquid flow to the nozzles in proportion to the speed.

The hydrodynamic laws of flowing liquids mean that a given nozzle can only function optimally within a relatively narrow flow regime.

Normally, modem salt trucks are therefore provided with several sets of nozzles, each set for each their flow regime. In this case, the sprayer boom is fitted with a row of revolvable nozzle holders, each carrying a number of nozzles set to each their specific flow.

The operator can now revolve the set of nozzles that matches the flow best at a given speed into the operational position so that the salting is done with optimally functioning nozzles.

When the speed changes, the operator then revolves another set of nozzles into operational position. In order to be able to do this, he must however get out of the cab, crawl in under the boom and manually revolve nozzle head after nozzle head until all nozzles in the next nozzle set are put in position.

The work of changing nozzles in this way is extremely difficult and time-consuming and especially so when it has to be done with short intervals. It is hardly possible to change the nozzles frequently enough in heavy traffic. Furthermore, the operation must often be done under extremely unpleasant working conditions where the operator has to crawl around on a cold, dirty and wet road in an uncomfortable position under the boom.

The example with the salt truck shows the way the problem presents itself at spraying tasks that take place with variable speed across an area.

For spraying of crops with e.g. pesticides from a sprayer boom on a tractor, it is for the sake of the environment advantageous to spray liquid quantity at the accepted minimum quantity per area unit whether the tractor is going slowly or fast.

For spraying with liquid fertilizers, it can moreover be necessary to proportion the extent of the fertilization to the character of the soil and the crops which are grown in the soil.

SUMMARY OF THE INVENTION

The object of the invention is to provide a sprayer boom of the kind mentioned in the opening paragraph with nozzle sets which can be put in optimum function at a given liquid flow more quickly and easily than known so far.

A novel and unique feature according to the invention, whereby this is achieved, is the nozzles are divided into sets, each with their valve arrangement for selectively shutting off and opening for liquid supply to the respective set. The nozzles which match a given situation can therefore be put in operation quickly and easily without the operator having to get out of the cab. The process can take place automatically without active contribution from the operator when each valve arrangement is arranged to open at a liquid flow volume through the feed pipe, which is fixed individually for the respective valve arrangement.

In an expedient embodiment, the nozzles sets can be placed one set each on their nozzle pipe, wherein the nozzle pipes two by two are liquidly interconnected to a cross pipe, in which is built-in a partition with a pressure valve for opening a passage through the respective partition at a prefixed liquid pressure.

In this case, only one of the nozzle pipes is directly fed with liquid from the feed pipe while the valves of the rest of the nozzles pipes are automatically opened like a cascade as the flow rises.

In a variant of this embodiment, the sprayer boom can have a manifold connected to the feed pipe and having a number of projecting nozzle pipes with a number of chambers defined by partitions with each their pressure valve for opening a passage through the respective partition at a prefixed liquid pressure, a nozzle being placed at each chamber. This construction is very reliable as admission of liquid to one or more nozzle sets do not depend on whether one single valve might fail.

When the nozzle sets are placed on each their nozzle pipes which, via each their liquid pipe with an inserted valve, is connected to a manifold which again is connected to the feed pipe, a nozzle pipe can optionally be connected from the cab by e.g. a rod system for activating the valves. In this case, the operator can read a speedometer and a flowmeter in the cab and, on the basis of his observations, calculate the combination of nozzle pipes which would be the optimum in a given situation. The solution is inexpensive and simple and can advantageously be employed when the nozzle sets only have to be changed at relatively long intervals.

In case of frequent changes, it would be better to employ an electronic control system with detectors for continuously registering liquid flow and speed respectively and transmitting the registered values as signals to a computer which, on the basis of the received signals, calculates the immediate optimum valve position and signals the valves to regulate themselves into these positions.

An especially simple and inexpensive control system can be obtained with a detector which registers e.g. the rotational speed of a wheel and converts this to control signals in the form of an impulse current or a voltage, which is a function of the registered speed.

DETAILED DESCRIPTION OF PREFERRED EMBODIMENTS

Figure 1:
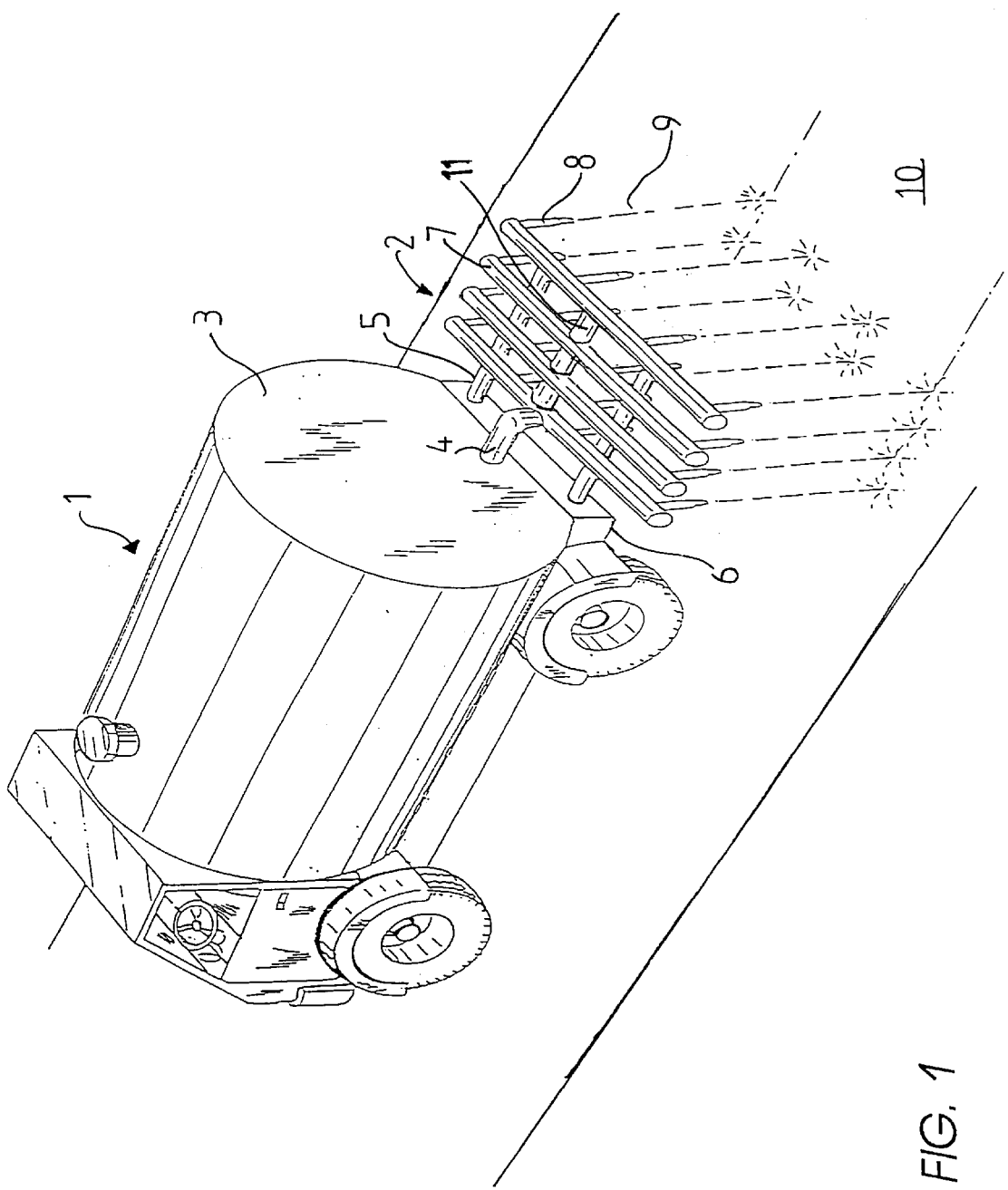
FIG. 1 is a perspective view of a salt truck with a sprayer boom according to the invention for spraying a brine out onto an icy and snow-slippery roadway.

The invention will be explained in detail below, describing exemplary embodiments with reference to the drawing. In the following, the invention is described on the assumption that the sprayer boom is employed for salting an icy or snow-slippery road with a brine, and that it is mounted on a salt truck with a storage tank for the brine.

However, the sprayer boom according to the invention can advantageously be employed for many other tasks, of which spraying of crops with pesticides and spreading of liquid fertilizer can be mentioned.

In FIG. 1, the salt truck is generally designated by the reference numeral 1 and the sprayer boom with the reference numeral 2. The salt truck has a storage tank 3 for storing a brine (not shown) which by means of a pump (not shown) is provided at pressure to the boom via a feed pipe 4 of which an extreme part is shown.

Belonging to the boom is an electronic control system (not shown) and an electronically controllable valve (not shown) which is inserted in the feed pipe. In operation, the control system regulates the valve so that the flow through the feed pipe is changed proportionally with the speed of the vehicle. In this way, the quantity of brine spread per area unit is attempted to be maintained on a prefixed volume irrespective of the present speed of the salt truck.

The salt truck 1 has a construction known per se and will therefore not be described any further here.

The boom 2 is mounted on two cantilever beams 5 attached on the chassis 6 of the vehicle. In the shown embodiment, the boom is made up of four nozzle pipes 7 extending transversely of the vehicle. Each nozzle pipe is provided with four downwards facing nozzles 8 which send brine jets 9 down onto a roadway 10 on which the vehicle is driving. The brine serves for de-icing an icy road and/or melting snow. The front nozzle pipe is connected to the feed pipe 4 and the rest of the pipes are connected to the first via cross pipes 11.

Figure 2:
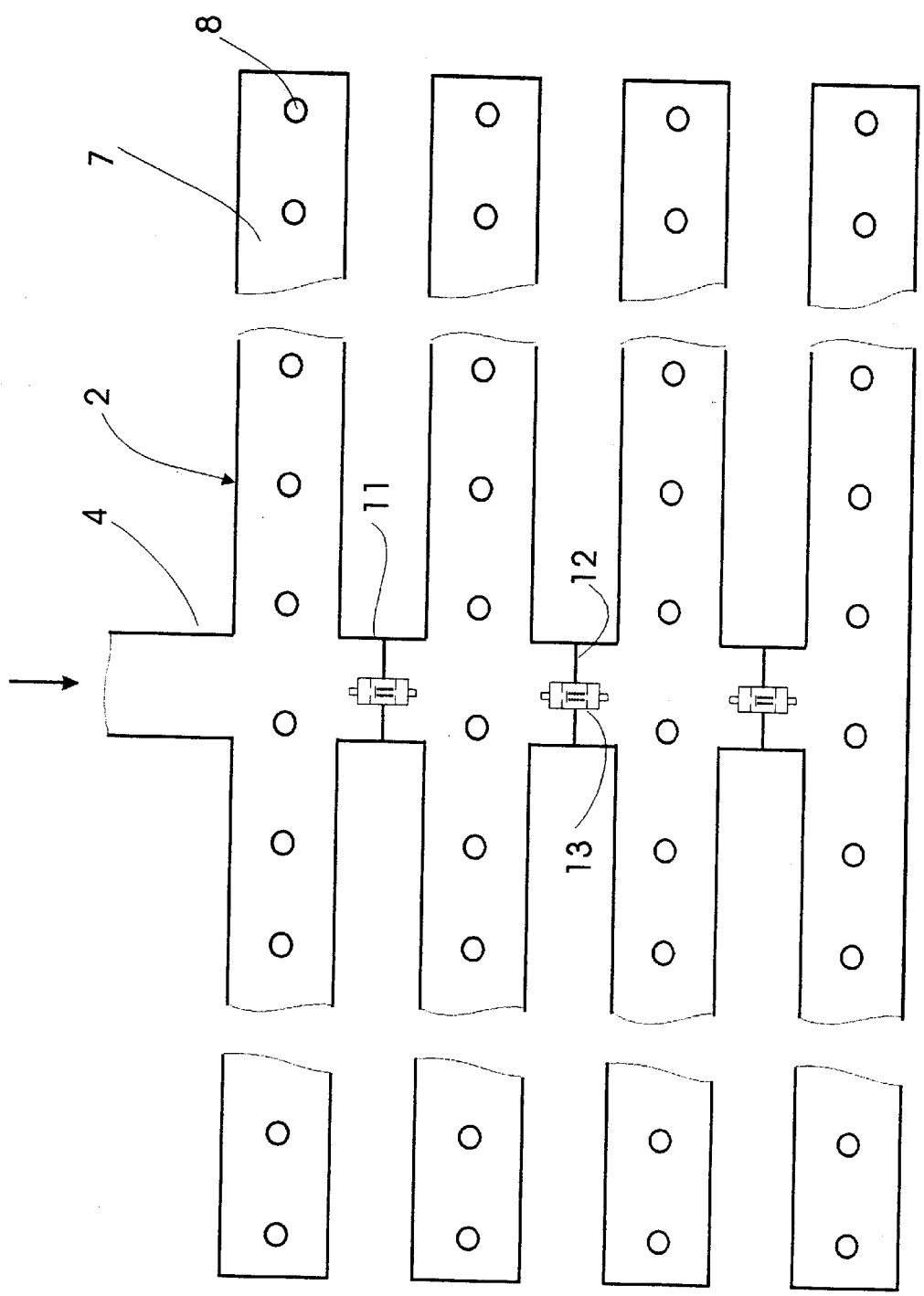
FIG. 2 is a schematic view of a first embodiment of a sprayer boom according to the invention.

FIG. 2 is a schematic view from beneath of the boom in FIG. 1 but with a larger number of nozzles 8. As can be seen, a partition 12 with a pressure valve 13 is inserted in each cross pipe 11.

At a slow speed and a correspondingly low liquid flow, all the pressure valves are closed, and it is therefore only the nozzles in the front nozzle pipe, that is, the nozzle pipe connected to the feed pipe, that are active. Greater speed requires more pressure for passing the increased amount of liquid out through the nozzles which at the same time will be functioning less efficiently. When the liquid pressure exceeds a predetermined limit, the pressure valve closest to the feed pipe opens for liquid flow to the next nozzle pipe in the row so that instead of one set of nozzles, there are now two sets of nozzles in operation. Thereby, the liquid pressure is eased across the nozzles, and all nozzles will be functioning within their optimum operating range. If the speed is increased further, the process is repeated nozzle pipe by nozzle pipe until all four nozzle pipes are put in action to spray the roadway. This takes place when the vehicle is running at the prefixed maximum speed.

As can be seen, for embodiments where fluid flow rate or pressure are proportional to truck speed, the boom thus regulates itself automatically to the present speed and without the operator contributing in any way.

The pressure valves can be arranged in such a way that they open gradually when the liquid pressure is increased. Thereby, a continuous regulation between minimum and maximum flow is obtained. If the pressure valves only have a completely closed and a completely open position, the regulation will take place at intervals, the extent of which depend on how many nozzle pipes are used. If the boom is provided with more than the four nozzle pipes in FIG. 1 and FIG. 2, the magnitude of the intervals is reduced.

In FIG. 1 and FIG. 2, the boom is shown with nozzle pipes that are extending transversely of the vehicle. However, this is only given by way of example as the pipes just as well can be extending along the vehicle or obliquely of this. According to requirements, there can furthermore be placed sprayer booms on the sides of the vehicle.

Figure 3:
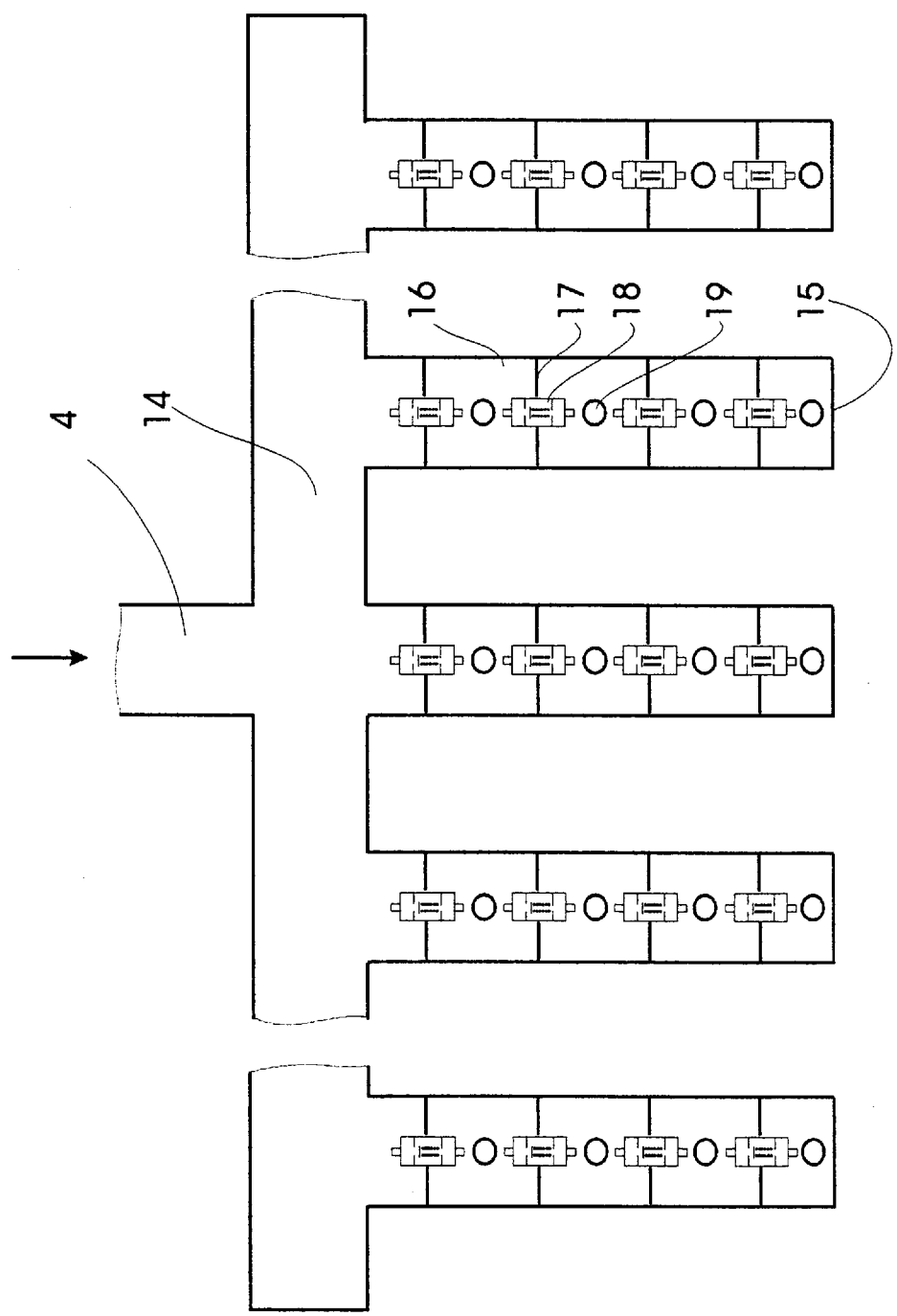
FIG. 3 is a schematic view of a second embodiment of a sprayer boom according to the invention.

FIG. 3 is a schematic view from below of a variant of the sprayer boom described above. In this case, the boom has a manifold 14 which is connected to the feed pipe 4. On the manifold is placed a number of projecting nozzle pipes 15, each having a pressure valve 18. Each nozzle pipe has a nozzle 19 at each chamber.

This sprayer boom functions in principle in the same way as the one shown in FIG. 2, with pressure valve after pressure valve being opened like a cascade as the liquid flow is increased at increasing speed. Thus, this boom is also completely self-regulating.

An almost continuous regulation can be obtained by arranging the valves in a set to open at different liquid pressures so that all valves in the set do not open simultaneously. The construction is very reliable, as it will function even if one of the valves fails.

Figure 4:
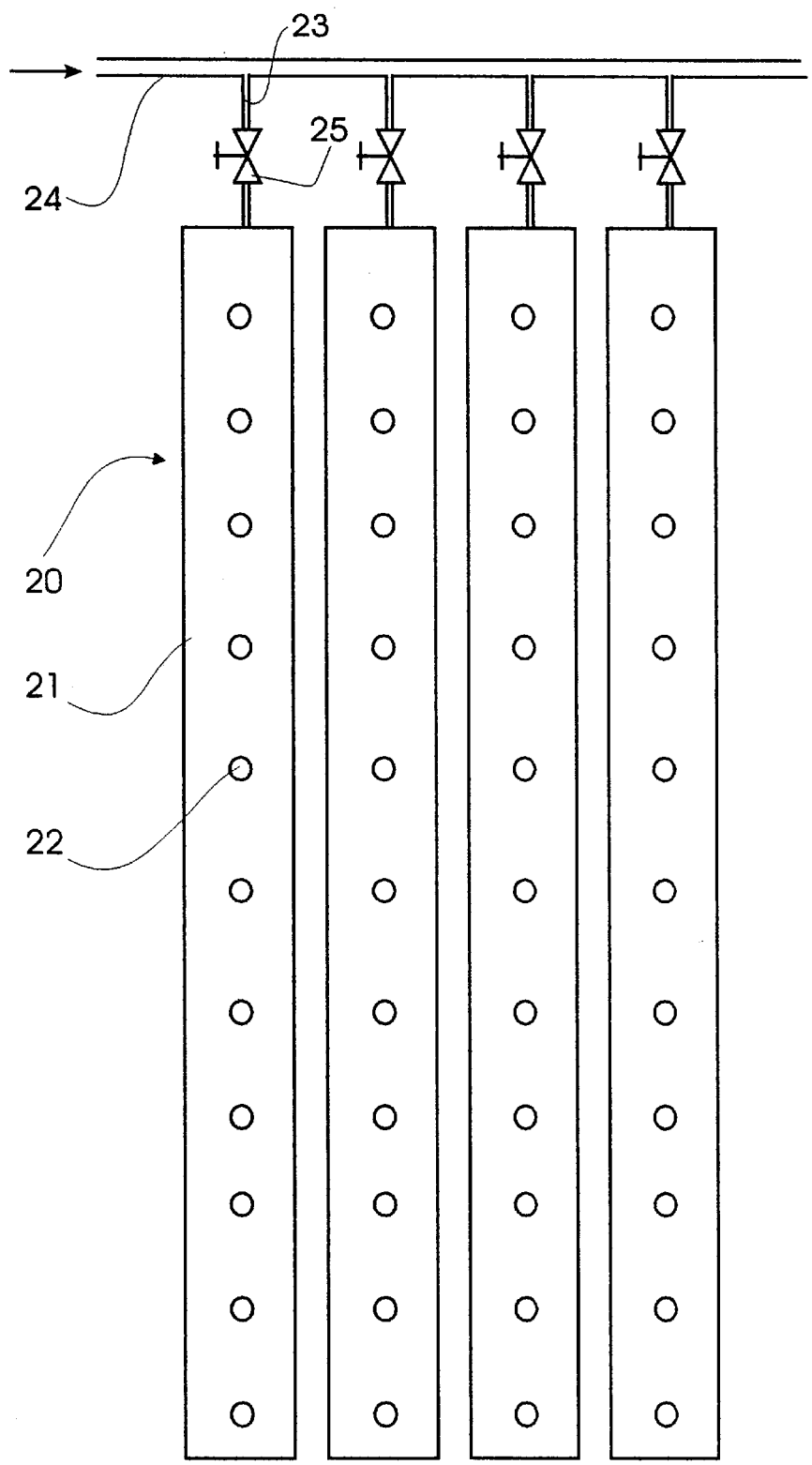
FIG. 4 is a schematic view of a third embodiment of a sprayer boom according to the invention.

FIG. 4 shows a second embodiment of a sprayer boom according to the invention. In this case, the sprayer boom 20 has four nozzle pipes 21, each provided with eleven nozzles 22. The nozzle pipes are via each their liquid pipe 23 connected to a manifold 24 which is connected to the feed pipe (not shown in the figure). In each liquid pipe 23 is inserted a valve 25, which can be worked manually, with which the operator can connect the nozzle pipe or pipes that match a given driving situation best.

The valves can be controlled from the cab by means of not shown rod system. The construction is simple and inexpensive and can therefore advantageously be employed when the need for changing nozzle sets is relatively rare. The boom is not fully automatic as the previously mentioned embodiments but by means of the manual regulation, the operator can rely on the information acquired by reading the speedometer of the vehicle and a flowmeter which measures the liquid flow from the pump.

Figure 5:
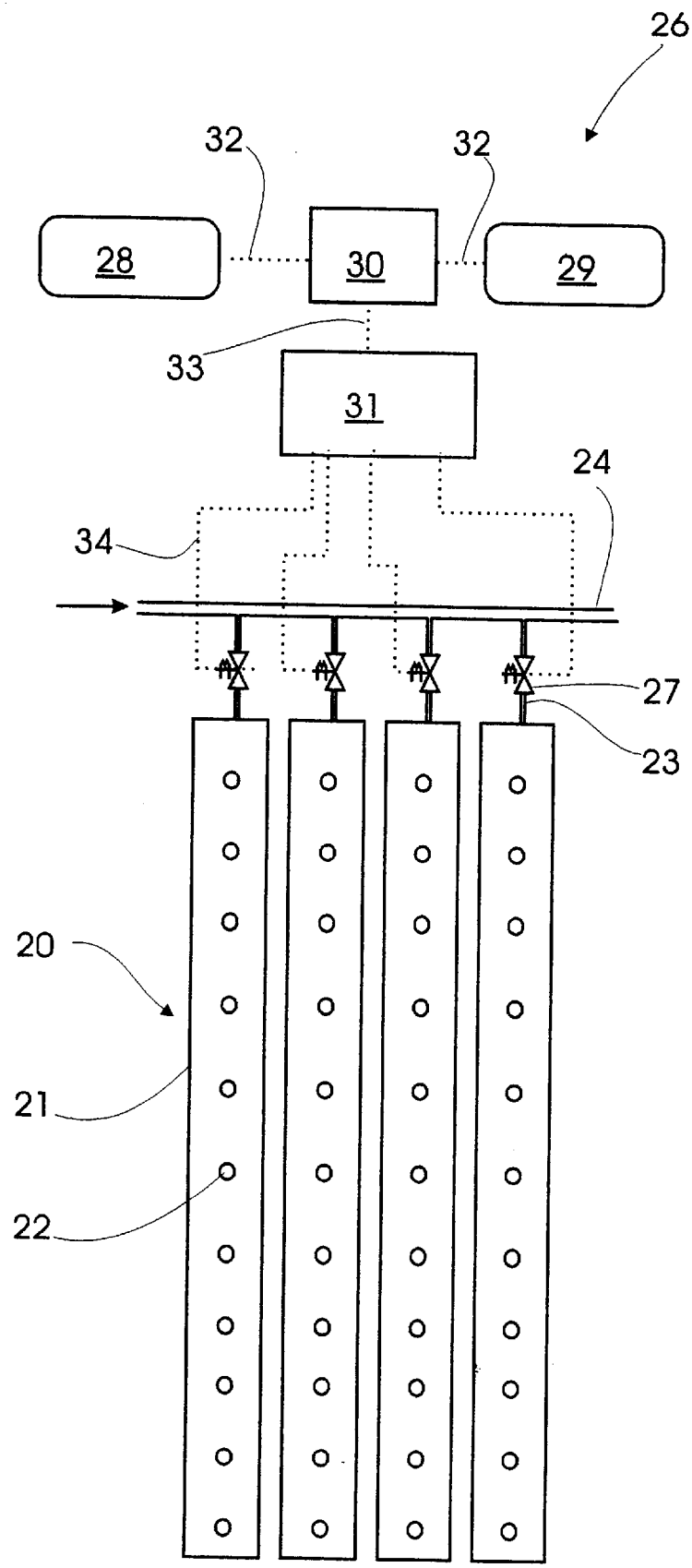
FIG. 5 is a schematic view of a fourth embodiment of a sprayer boom according to the invention.

FIG. 5 shows the sprayer boom in FIG. 4 but with automatic regulation by means of a control system 26 for controlling solenoid valves 27 inserted in the liquid pipes 23. Components equivalent to those of FIG. 4 are similarly referenced.

The control system comprises a detector 28 for registering the speed of the vehicle, a second detector 29 for registering the liquid flow from the pump, a computer 30, and an amplifier 31. The detectors 28 and 29 are with wires 32 connected to the computer 30 which again is connected to the amplifier 31 via wires 33. There are furthermore wires 34 from the amplifier to the valves 27.

In operation, the detectors continuously transmit, via the wires 32, signals representing the values of speed and liquid flow respectively to the computer 30. The computer calculates by means of a purpose-made program the combination of valve positions which is the optimum in the present situation, and transmits, via the wire 33, signals representing the calculated combination to the amplifier 31 where the signals are amplified. The amplified signals are then transmitted, via the wires 34, to the solenoid valves 27 which then are opened or closed in accordance with the received signals.

In this embodiment, the manual regulation of the embodiment in FIG. 4 is thus replaced by a fully automatic regulation. This embodiment is especially suitable for conditions where valve regulation have to take place with relatively short time intervals.

Figure 6:
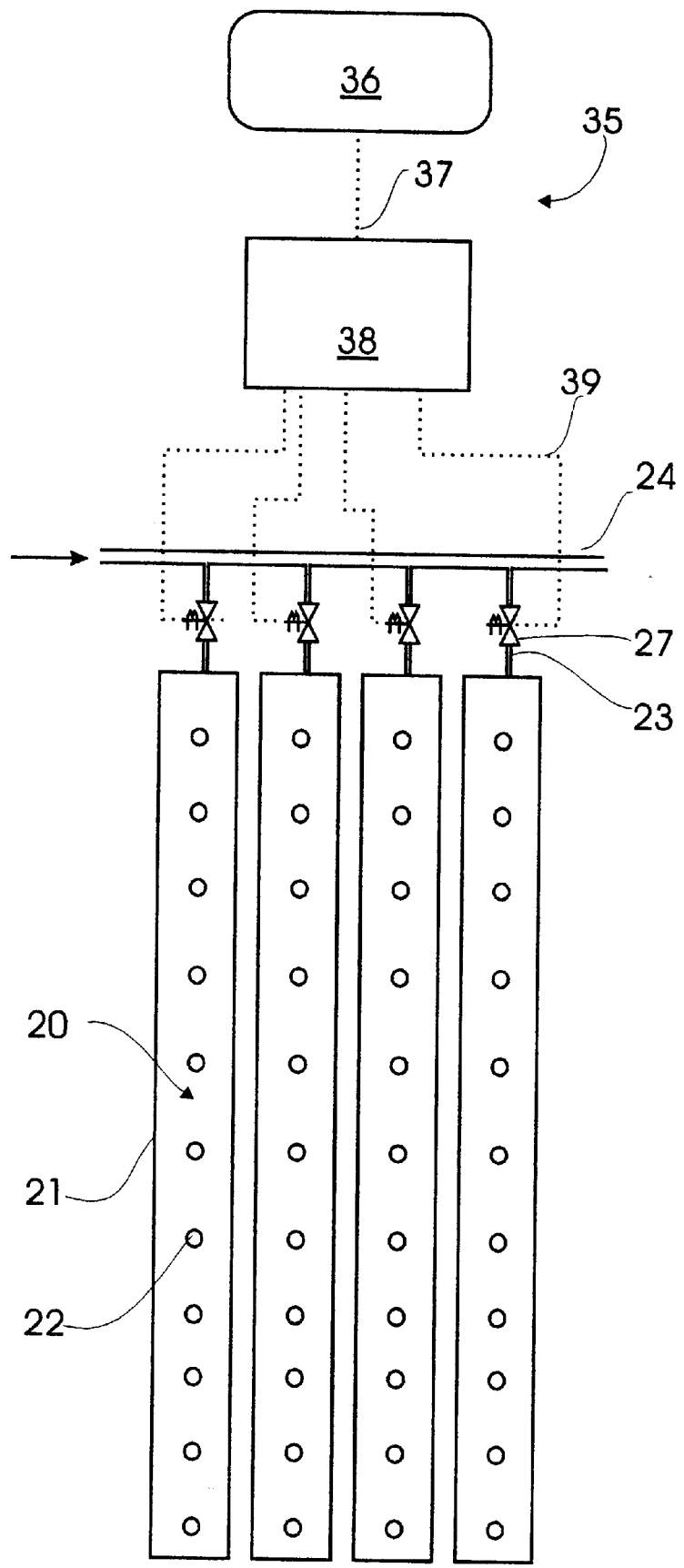
FIG. 6 is a schematic view of a fifth embodiment of a sprayer boom according to the invention.

The sprayer boom in FIG. 6 corresponds to the one shown in FIG. 5 with the exception that another control system 35 is used, this one merely comprising a single detector 36 for registering the present speed of the vehicle by measuring e.g. revolutions or distance traveled on one of its wheels. In operation, the detector transmits, via a wire 37, signals representing the registered value of the speed to an amplifier 38 for amplifying the signals. The amplified signals are then transmitted, via wires 39, to the solenoid valves 27.

In this embodiment, the detector is arranged to give signals of an amplitude which is proportional to the registered speed. The signals can e.g. be transmitted in the form of an impulse sequence or a voltage. In the latter case, the detector can be a generator which produce current with a voltage that rises with increasing speed. The valves can correspondingly be arranged to open at predetermined voltages. This control system is simple in its construction and is inexpensive to manufacture.

What is claimed is:

1. A sprayer boom (2) adapted to be connected to a vehicle, wherein said sprayer boom has:
    a number of liquid nozzles (8) adapted to spray a carriageway during driving wherein said nozzles are divided into sets comprising one or a plurality of nozzles;
    a feed pipe (4) liquidly connected to a storage container (3) and. to the nozzles (8), wherein the feed pipe (4) is adapted to convey a liquid fed under pressure from the storage container (3) to the nozzles (8), characterized in that
    the nozzle sets are placed on each their nozzle pipe (7;15;21) that liquidly connects the nozzles (8) in the set;
    at least one cross pipe (11) liquidly connects at least two nozzle pipes (7;15;21) in series two by two;
    wherein each cross pipe has at least one partition (12) with a pressure valve (13) arranged to open a passage through the respective partition at a prefixed liquid pressure such that at least one of the nozzle pipes (7;15,21) in not directly connected to the feed pipe (4) but has a cross pipe (11) and a partition (12) disposed therebetween; and
    wherein at least one, but not all, of said nozzle pipes are connected directly to the feed pipe (4).

2. A sprayer boom (2) according to claim 1, characterized in that the nozzle sets each comprise a valve (13) for selectively shutting off and opening for liquid supply to the respective set.

3. A sprayer boom (2) according to claim 2, characterized in that each valve(13) is arranged to open at a liquid flow volume through the feed pipe (4), which is fixed individually for the respective valve.

4. A sprayer boom (2) according to claim 3, characterized in that the nozzle pipe closest to the storage container (3) is directly connected to the feed pipe (4).

5. A sprayer boom (2) according to claim 3, characterized in that the nozzle sets are placed on each their nozzle pipe which via each their liquid pipe is directly connected to a manifold which again is connected to the feed pipe, and that in each liquid pipe is inserted a valve which can be worked manually for shutting off and opening for liquid supply to the respective nozzle pipe.

6. A sprayer boom (2) according to claim 5, further comprising a rod system for opening and closing valves which can be worked manually.

7. A sprayer boom (2) according to claim 3, characterized in that the nozzle sets are placed on each their nozzle pipe which via each their liquid pipe is directly connected to a manifold which again is connected to the feed pipe, wherein each liquid pipe comprises an electrically controllable valve for shutting off and opening for liquid. supply to the respective nozzle pipe, and an electronic control system for selectively controlling the respective valves.

8. A sprayer boom (2) according to claim 7, characterized in that the control system comprises a detector (29) for registering the volume of the present liquid flow in the feed pipe, a second detector (28) for registering the present speed of the vehicle, and a computer (30) with a program configured to convert the registered values to control signals to the valves.

9. A sprayer boom (2) according to claim 7, characterized in that the control system (35) comprises a detector (36) arranged to give control signals to the valves in the form of an impulse current or a voltage which is a function of the present speed of the vehicle.

10. A sprayer boom (2) according to claim 2, characterized in that the nozzle pipe closest to the storage container (3) is directly connected to the feed pipe (4).

11. A sprayer boom (2) according to claim 2, characterized in that the sprayer boom further comprises at least one manifold (14; 24) connected directly to the feed pipe, wherein a plurality of projecting nozzle pipes are placed in a mutual distance along and are liquidly connected to the manifold, wherein each nozzle pipe is a number of cambers (16) defined by paritions (17) having each their sure valve arranged to open a passage through the respective partition at a prefixed liquid pressure, and that in at least some of the chambers is placed a nozzle.

12. A sprayer boom (2) according to claim 2, characterized in that the nozzle sets are placed on each their nozzle pipe which via each their liquid pipe is directly connected to a manifold which again is connected to the feed pipe, and that in each liquid pipe is inserted a valve which can be worked manually for shutting off and opening for liquid supply to the respective nozzle pipe.

13. A sprayer boom (2) according to claim 12, further comprising a rod system for opening and closing valves which can be worked manually.

14. A sprayer boom (2) according to claim 2, characterized in that the nozzle sets are placed on each their nozzle pipe which via each their liquid pipe is directly connected to a manifold which again is connected to the feed pipe, wherein each liquid pipe comprises an electrically controllable valve for shutting off and opening for liquid supply to the respective nozzle pipe, and an electronic control system for selectively controlling the respective valves.

15. A sprayer boom (2) according to claim 14, characterized in that the control system comprises a detector (29) for registering the volume of the present liquid flow in the feed pipe, a second detector (28) for registering the present speed of the vehicle, and a computer (30) with a program configured to convert the registered values to control signals to the valves.

16. A sprayer boom (2) according to claim 14, characterized in that the control system (35) comprises a detector (36) arranged to give control signals to the valves in the form of an impulse current or a voltage which is a function of the present speed of the vehicle.

17. A sprayer boom (2) according to claim 1, characterized in that the nozzle pipe closest to the storage container (3) is directly connected to the feed pipe (4).

18. A sprayer boom (2) according to claim 1, characterized in that the sprayer boom her comprises at least one manifold (14; 24) connected directly to the feed pipe, wherein a plurality of projecting nozzle pipes are placed in a mutual distance along and are liquidly connected to the manifold, wherein each nozzle pipe comprises a number of chambers (16) defined by partitions (17) having each their pressure valve arranged to open a passage through the respective partition at a prefixed liquid pressure, and that in at least some of the chambers is placed a nozzle.

19. A sprayer boom (2) according to claim 1, characterized in that the nozzle sets are placed on each their nozzle pipe which via each their liquid pipe is directly connected to a manifold which again is connected to the feed pipe, and that in each liquid pipe is inserted a valve which can be worked manually for shutting off and opening for liquid supply to the respective nozzle pipe.

20. A sprayer boom (2) according to claim 19, further comprising a rod system for opening and closing valves which can be worked manually.

21. A sprayer boom (2) according to claim 1, characterized in that the nozzle sets are placed on each their nozzle pipe which via each their liquid pipe is directly connected to a manifold which again is connected to the feed pipe, wherein each liquid pipe comprises an electrically controllable valve for shutting off and opening for liquid supply to the respective nozzle pipe, and an electronic control system for selectively controlling the respective valves.

22. A sprayer boom (2) according to claim 21, characterized in that the control system comprises a detector (29) for registering the volume of the present liquid flow in the feed pipe, a second detector (28) for registering the present speed of the vehicle, and a computer (30) with a program configured to convert the registered values to control signals to the valves.

23. A sprayer boom (2) according to claim 21, characterized in that the control system (35) comprises a detector (36) arranged to give control signals to the valves in the form of an impulse current or a voltage which is a function of the present speed of the vehicle.

24. A sprayer boom (2) according to claim 2, wherein the sprayer boom comprises three sets of nozzles, the nozzles in the three sets being liquidly connected by first, second, and third nozzle pipes, respectively, and first and second cross pipes (11), and wherein:

the first cross pipe (11) liquidly connects the first and second nozzle pipes in series two by two, the fit cross pipe has at least one partition (12) with a pressure valve (13) disposed between the first and second nozzle pipes, the pressure valve is arranged to open a passage trough the respective partition at a prefixed liquid pressure, and the second nozzle pipe is not directly connected to the feed pipe (4); and the second cross pipe (11) liquidly connects the second and a third nozzle pipes in series two by two, wherein the second cross pipe has at least one partition (12) with a pressure valve (13) disposed between the second and third nozzle pipes, wherein the pressure valve is arranged to open a passage through the respective partition at a prefixed liquid pressure, and wherein the third nozzle pipe is not directly connected to the feed pipe (4).

* * * * *

UNITED STATES PATENT AND TRADEMARK OFFICE
CERTIFICATE OF CORRECTION

PATENT NO.     : 6,454,183 B1
DATED          : September 24, 2002
INVENTOR(S)    : Albert Hedegaard It is certified that error appears in the above-identified patent and that said Letters Patent is hereby corrected as shown below:

Column 5,
Line 42, after "wherein", insert -- , --;

Column 6,
Line 46, delete "sure", insert -- pressure --;

Column 7,
Line 17, delete "her", insert -- further --; and

Column 8,
Line 23, delete "fit", insert -- first --.

Signed and Sealed this

Eleventh Day of February, 2003

JAMES E. ROGAN
*Director of the United States Patent and Trademark Office*